United States Patent
Rothaus

(10) Patent No.: US 9,432,728 B1
(45) Date of Patent: Aug. 30, 2016

(54) PERIPHERAL TRANSPONDER BONDING MODULE

(71) Applicant: The DIRECTV Group, Inc., El Segundo, CA (US)

(72) Inventor: Robert J. Rothaus, Placentia, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 0 days.

(21) Appl. No.: 14/586,141

(22) Filed: Dec. 30, 2014

(51) Int. Cl.
*H04N 7/173* (2011.01)
*H04N 21/44* (2011.01)
*H04N 21/61* (2011.01)

(52) U.S. Cl.
CPC .......... *H04N 21/44* (2013.01); *H04N 21/6156* (2013.01); *H04N 21/6193* (2013.01)

(58) Field of Classification Search
CPC .. H04N 7/20; H04N 21/435; H04N 21/4622; H04N 21/4782; H04N 7/17318
USPC ............... 725/68, 71, 109, 199, 131–134, 725/139–142, 151–153
See application file for complete search history.

(56) References Cited

U.S. PATENT DOCUMENTS

| | | | | |
|---|---|---|---|---|
| 5,883,621 A * | 3/1999 | Iwamura | ........... | H04L 12/40078 348/E5.103 |
| 6,647,254 B1 * | 11/2003 | Chen | ........... | G06F 3/033 455/344 |
| 6,754,347 B1 * | 6/2004 | Hamada | ........... | H04L 21/4135 348/E5.007 |
| 6,836,658 B1 * | 12/2004 | Sharon | ........... | H04B 7/18523 370/323 |
| 8,732,780 B2 * | 5/2014 | Kahn | ........... | G06F 21/10 725/109 |
| 8,934,833 B2 * | 1/2015 | Dragne | ........... | H04B 7/185 370/328 |
| 8,939,341 B2 * | 1/2015 | Pedicini | ........... | B25C 1/06 173/201 |
| 2003/0043260 A1 * | 3/2003 | Yap | ........... | G11B 20/10 348/14.06 |
| 2003/0235236 A1 * | 12/2003 | Santhoff | ........... | H04B 1/71632 375/130 |
| 2005/0229212 A1 * | 10/2005 | Kuether | ........... | H04N 5/44543 725/58 |
| 2007/0266414 A1 * | 11/2007 | Kahn | ........... | H04N 7/162 725/113 |
| 2007/0300255 A1 * | 12/2007 | Londero | ........... | H04N 5/44543 725/42 |
| 2010/0175097 A1 * | 7/2010 | Zhang | ........... | H04N 5/4401 725/109 |
| 2010/0313216 A1 * | 12/2010 | Levitan | ........... | G06Q 30/02 725/32 |
| 2011/0050491 A1 * | 3/2011 | Foerster | ........... | G01S 19/24 342/357.25 |
| 2012/0015618 A1 * | 1/2012 | Heikkinen | ........... | H04M 1/6058 455/230 |
| 2012/0017233 A1 * | 1/2012 | Kudelski | ........... | G11B 20/00086 725/25 |

* cited by examiner

*Primary Examiner* — Annan Shang
(74) *Attorney, Agent, or Firm* — McDonnell Boehnen Hulbert & Berghoff LLP

(57) ABSTRACT

A tuner receives an input signal in which a high bandwidth video data stream is multiplexed amongst multiple fixed-bandwidth channels. The tuner receives instructions to output the high bandwidth video data stream and tunes and demodulates the input signal for the multiple fixed-bandwidth carriers in parallel. The tuner can apply error correction to the demodulated signal and identify data packets associated with the high bandwidth video data stream. The tuner combines the identified data packets to recover the original high bandwidth video data stream and outputs the high bandwidth video data stream via a universal serial bus port. As such, the tuner can be connected to a legacy receiver unit as an external module that enables the legacy receiver unit to receive high bandwidth video data streams that are multiplexed amongst multiple fixed-bandwidth channels.

20 Claims, 7 Drawing Sheets

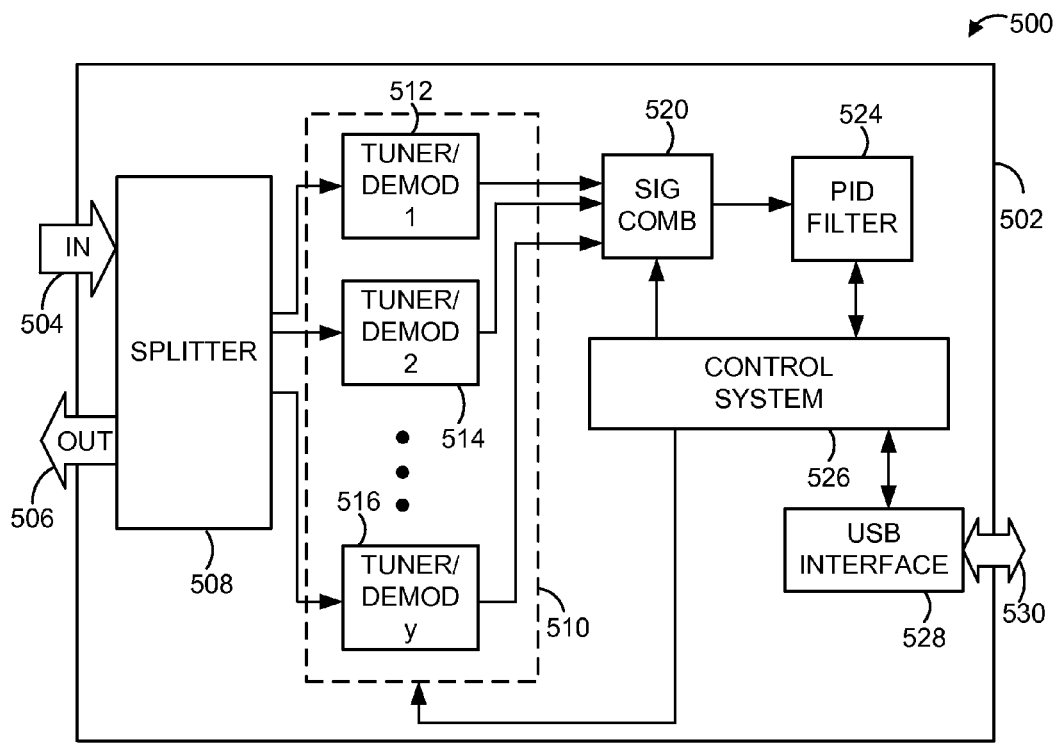
FIG. 5
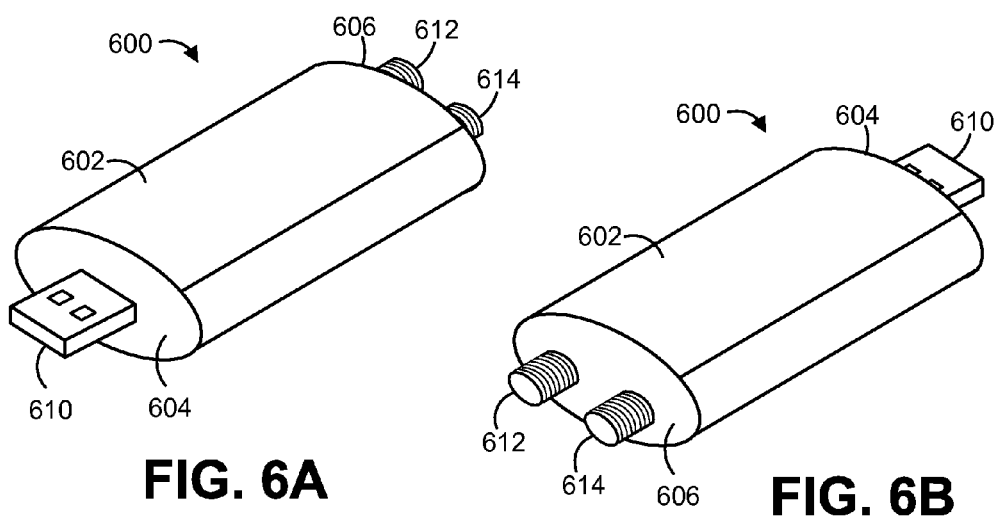
FIG. 6A  FIG. 6B

PERIPHERAL TRANSPONDER BONDING MODULE

BACKGROUND

Satellite broadcast systems are used to distribute audio, video, and data content to end users using a constellation of communication satellites. Media content is encoded on modulated radio frequency signals that are transmitted to the satellite network in an uplink transmission. The communication satellites are equipped with multiple transponders that process the incoming uplink signal and then transmit a frequency-shifted version of the uplink signal as the downlink signal. Satellite broadcast systems thereby allow for wirelessly distributing media content without a direct line of sight between the uplink station and each subscriber. As these systems have evolved, there has been an ongoing demand for additional bandwidth and/or more efficient use of existing bandwidth to carry an ever-increasing amount of content. Due to a combination of existing legacy hardware systems and regulatory issues, most content continues to be broadcast over a set of transmission channels with fixed bandwidth capacities.

In a simple version, each of the transponders may function as repeaters that emit a frequency-shifted version of a portion of the uplink signal. Together, a set of transponders on the satellite can be used to create a downlink signal on a set of carriers that each correspond to one of the transponders. Thus, the set of transponders on a satellite define a set of downlink carriers (channels) for reception at receiver stations on the ground for each subscriber. The receiver stations include an antenna (e.g., a satellite dish) for detecting the downlink signals and a set top box (STB) that receives signals detected at the antenna and extracts the digital media content streams from those signals. The STB can include various hardware components for tuning and demodulating the radio frequency downlink signals, signal processing electronics for decoding, applying error correction, and/or video drivers that convert the media data stream into instructions for driving a video display.

To ease bandwidth constraints, video data is generally compressed prior to transmission using techniques based on standards such as MPEG-2 and MPEG-4 and various other coder/decoder specifications (codecs). Video compression reduces the required bandwidth of a given video stream while maintaining high visual quality. Compression also results in a variable bit-rate data stream. In particular, video compression requires a relatively high bit rate to represent video scenes depicting rapid movement or scenes with high degree of textured scenery (e.g., a sporting event) whereas a relatively low bit rate is required to represent video scenes depicting a stable background scene with slow movement in the foreground (e.g., a news program).

To accommodate a variable bit-rate compressed video signal on a fixed bit-rate carrier channel, the bandwidth capacity of the carrier channel must exceed the peak bit-rate of the video signal. For most types of compressed video content, the peak bit-rate exceeds the average bit-rate by a significant amount. To make efficient use of the bandwidth capacity of the carrier channels, multiple compressed video signals may be multiplexed together using a statistical multiplexer prior to transmission over the fixed bit-rate carrier channels. Because the bit-rate peaks of the different compressed video signals are unlikely to occur simultaneously, the combined signal provides a data stream with a relatively more stable bit-rate to be transmitted over the fixed bit-rate carrier. The combined signal may have a bit-rate that corresponds to the bandwidth capacity of a single transponder carrier, and the combined signal can be transmitted using a single transponder.

In practice, additional bandwidth margin is required for error correction, overhead messaging, and accounting for occasional bit-rate peaks in the combined signal, but the statistical multiplexing process still provides spectral efficiency benefits when transmitting multiple variable bit-rate signals over fixed bit-rate channels, such as satellite transponder carriers.

In addition to the compression used, the bandwidth required to stream video data also depends on the resolution and frame rate of the underlying video. A digital video stream can be thought of as a series of images of a particular resolution as well as associated audio content. Each frame of a video is an image with pixels arranged in rows and columns. Video resolution is typically characterized by the number of rows of pixels in each frame image. The frame rate typically refers to the speed at which each frame is displayed as the video is played out. The frame rate may also be referred to as the refresh rate (e.g., the time between successive updates of a given pixel value). Progressive video updates each pixel of a frame at each frame refresh. Interlaced video updates alternating rows for each frame refresh. Thus, interlaced video requires less bandwidth than progressive video for a given resolution and frame rate of the same video content.

For example, standard definition (SD) video refers to a class of video content with frames having 480 rows that are progressively scanned and frame rates of about 24 or 30 frames per second. For shorthand, such SD video may be identified as 480p24 (i.e., 480 rows per frame, progressively scanned, at 24 frames per second) or 480p30 (i.e., 480 rows per frame, progressively scanned, at 30 frames per second). Similarly, high definition (HD) video may be identified as 720p24 (i.e., 720 rows per frame, progressively scanned, at 24 frames per second) or 1080i30 (i.e., 1080 rows per frame, interlaced, at 30 frames per second), or 1080p24 (i.e., 1080 rows per frame, progressively scanned, at 24 frames per second).

Existing satellite transponders have bandwidth capacities sufficient to carry a multiplexed stream of a combination of two to ten compressed video streams when the underlying video content is SD video or HD video (e.g., 480p24, 1080i30 or 720p24). Such video content is referred to as low bandwidth, because the bandwidth requirement of such content is low compared to the bandwidth capacity of an individual satellite transponder carrier. However, video content requiring higher bit rates is being introduced, such as 1080p60, high definition three-dimensional video (which requires twice the frame rate to separately display content for perception by the left and right eyes in alternating frames), and 4 KTV, which has twice the number of rows as high definition television, and thus four times the number of pixels per frame (e.g., 2160p24). Such video content is referred to as high bandwidth, because the bandwidth requirement of such content is high compared to the bandwidth capacity of an individual satellite transponder carrier channel.

SUMMARY

In many cases the peak bit-rate of compressed high bandwidth video content exceeds the capacity of an individual transponder carrier. Yet the demand for high bandwidth content is increasing, and so satellite broadcasters developed a technique for transmitting high bandwidth content using multiple transponder carriers simultaneously. A high bandwidth video stream is compressed into a variable bit-rate signal, and the compressed signal is parsed into a series of data packets. The data packets for the single high bandwidth video stream are then divided across multiple transponder carriers and broadcast to subscribers via uplink and downlink transmissions for those transponder carriers. Then, to recover the high bandwidth content from the multiple downlink transponder carriers, a receiver STB uses multiple tuners and demodulators to demodulate signals on the multiple transponder carriers simultaneously. Data packets for the high bandwidth content are identified from the demodulated data and combined to reconstitute the high bandwidth digital video stream.

Techniques for transmitting high bandwidth content over multiple transponder carriers in parallel and then assembling the high bandwidth content at the STB by simultaneously demodulating multiple transponder carriers and combining the data packets for the high bandwidth content are referred to as transponder bonding. Similarly, transponder carriers that are used in parallel to carry high bandwidth content are referred to as transponder bonded carriers. The transponder carriers collectively provide a transmission channel with a bandwidth capacity comparable to the sum of the bandwidth capacities of the bonded carriers.

Prior to development of high bandwidth video data sources, such as 4 KTV, STBs were not configured to receive transponder bonded signals. Such legacy STBs may include multiple tuner/demodulators to simultaneously tune and demodulate signals on multiple transponder carriers, and then extract video data streams within those carriers by filtering the demodulated signal for packets with particular identifiers. As such, legacy STBs may be used to simultaneously receive video streams on different transponder carriers (e.g., such as when one video program is being viewed while another is recorded for later viewing). However, many legacy STBs lack hardware capable of combining demodulated signals from multiple transponder carriers to recover a very high bandwidth data stream that can then be filtered based on packet identifiers, which is necessary to receive transponder bonded signals.

At present, there are tens of millions of such legacy STBs in use by subscribers and replacing those STBs with updated versions configured to receive transponder bonded signals would require a major investment in the range of several hundred dollars per unit. In particular, in addition to the transponder bonding functionality, each replacement unit would also include data storage for hosting locally recorded video content, video drivers for decoding video content and generating video driving signals, among other components. However, the present disclosure provides for a peripheral module that can receive transponder bonded signals and be connected to a legacy STB via a data port such as a universal serial bus (USB) port.

In addition to the data port, the peripheral module includes an input port for receiving a satellite antenna signal, and multiple tuners and demodulators for demodulating multiple transponder carriers in parallel. The peripheral module also includes a processing system that receives an instruction to demodulate a particular high bandwidth video data stream that is carried on a group of transponder bonded carriers. The processing system then causes the tuners and demodulators to demodulate signals on each of the group of transponder bonded carriers. The demodulated signals are combined to recover the data stream that includes the particular high bandwidth video data stream. The processing system may also process the combined data stream in accordance with forward error correction (FEC) or another encoding process applied to the data stream. The combined data stream can be filtered using packet identifiers to extract the particular high bandwidth video data stream, and the resulting high bandwidth video data stream can be output from the data port to the legacy STB. The legacy STB can then use the received video data stream similarly to any other video data streams demodulated within the STB (e.g., the STB may use the video data stream to generate video driver signals or to create a recording for later viewing).

The disclosed peripheral transponder bonding module therefore overcomes the hardware limitations of legacy STBs and allows legacy STBs to be used to receive transponder bonded signals without requiring replacement of the useful components of the legacy STB. In addition, the disclosed peripheral transponder bonding module can be produced and provided to subscribers at a fraction of the price of an entirely new STB that incorporates transponder bonding functionality.

In particular, in one example, an apparatus is disclosed. The apparatus can include: a housing, an input interface, a plurality of demodulators, a signal combiner, and a control system. The input interface can be configured to receive a satellite signal. The control system can be operable to: (i) receive, via a universal serial bus (USB) interface, an indication of a particular high bandwidth video-data stream that is distributed amongst two or more channels of the satellite signal; (ii) cause two or more of the demodulators to demodulate the two or more channels, such that an output from each of the two or more demodulators is based on at least a portion of the particular high bandwidth video-data stream; (iii) operate the signal combiner to generate a combined data stream based on demodulated outputs from the two or more demodulators; (iv) identify data packets in the combined data stream having one or more packet identifiers associated with the particular high bandwidth video data stream; (v) generate the high bandwidth video data stream using the identified data packets; and (vi) output the generated high bandwidth video data stream via the USB interface.

In another example, a method is disclosed. The method can involve receiving, via an input interface, a satellite signal. The method can also involve receiving, via a universal serial bus (USB) interface, an indication of a particular high bandwidth video-data stream distributed amongst two or more channels of the satellite signal. The method can also involve demodulating the two or more channels via two or more of a plurality of demodulators, such that an output from each of the two or more demodulators is based on at least a portion of the particular high bandwidth video-data stream. The method can also involve generating a combined data stream based on demodulated outputs from the two or more demodulators. The method can also involve identifying data packets in the combined data stream having one or more packet identifiers associated with the particular high bandwidth video-data stream. The method can also involve generating the high bandwidth video-data stream using the identified data packets. The method can also involve outputting the generated high bandwidth video-data stream via the USB interface.

In yet another example, a method is disclosed. The method can involve receiving, via a user interface, an input indicative of a particular high bandwidth video-data stream that is distributed amongst two or more channels of a satellite signal. The method can also involve sending, via a universal serial bus (USB) interface, an indication of the particular high bandwidth video-data stream to a peripheral device coupled to receive the satellite signal, wherein the peripheral device is configured to: (i) use two or more of a plurality of demodulators to demodulate the two or more channels of the satellite signal on which the particular high bandwidth video-data stream is distributed; (ii) generate a combined data stream based on outputs of the two or more demodulators; (iii) identify data packets in the combined data stream having one or more packet identifiers associated with the particular high bandwidth video-data stream; (iv) generate the particular high bandwidth video data stream using the identified data packets; and (v) output the generated particular high bandwidth video data stream via the USB interface. The method can also involve receiving the particular high bandwidth video-data stream via the USB interface.

Also disclosed herein are structures configured to facilitate implementation of the disclosed methods. One embodiment may take the form of a computing device (e.g., a communication device, computing system, etcetera (etc.)) that includes a communication interface, a processor, data storage, and program instructions executable by the processor for carrying out the functions described herein. Another embodiment may take the form of a non-transitory computer-readable medium having instructions stored thereon for carrying out some or all of the functions described herein.

The foregoing summary is only provided for example purposes and is not intended to be in any way limiting. In addition to the aspects, embodiments, and features described above, further aspects, embodiments, and features will become apparent by reference to the drawings and the following detailed description.

BRIEF DESCRIPTION OF THE DRAWINGS

Various embodiments are described herein with reference to the following drawings, in which like numerals denote like entities.

FIG. 5 is a functional block diagram of an example peripheral transponder bonding module.

FIGS. 6A and 6B are aspect views of an example USB transponder bonding module.

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. Example Digital Broadcast System

Figure 1:
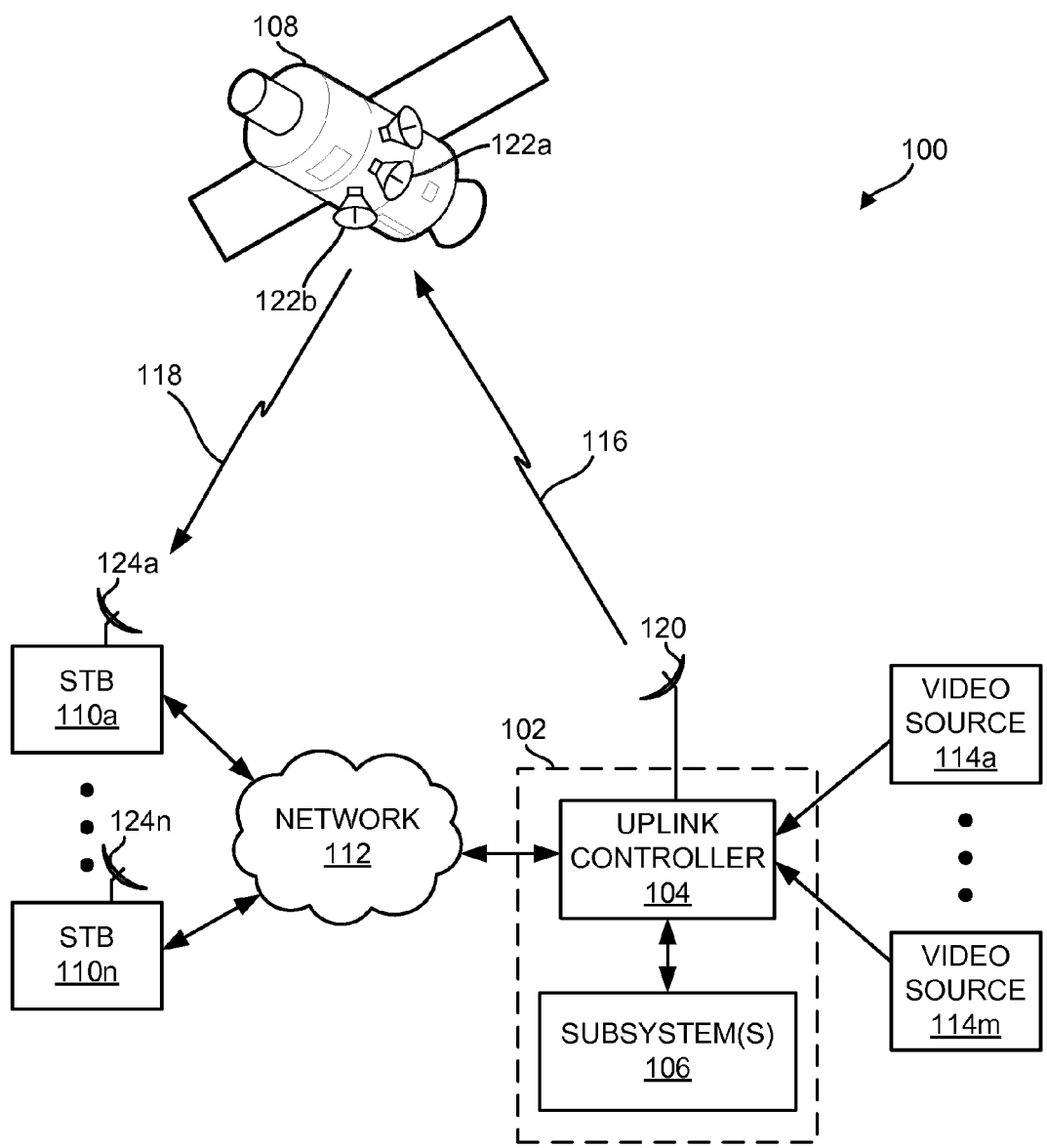
FIG. 1 is a functional block diagram of an example digital broadcast system.

FIG. 1 is a simplified block diagram that illustrates a digital broadcast system 100. The digital broadcast system 100 includes a content distribution system 102, a satellite 108, and one or more receiver stations 110a, 110n. The receiver stations 110a, 110n may communicate with the content distribution system 102 via network 112. The content distribution system 102 includes an uplink controller 104 that receives one or more data streams from video sources 114a, 114m and operates an uplink antenna 120 to transmit an uplink signal 116 indicative of the received data stream(s). The satellite 108 includes one or more antennas 122a, 122b and various signal processing subsystems. Using one or more of the antennas 122a, 122b and/or signal processing subsystems, the satellite 108 receives the uplink signal 116 transmitted from the uplink antenna 120 and transmits the downlink signal 118 to the receiver stations for individual subscribers. In some examples, a single antenna may be used to receive data via an uplink signal and transmit data via a downlink signal. Other examples are also possible.

Each receiver station includes an antenna for receiving the downlink signal 118 and a set top box (STB) with electronics for processing the antenna signal to extract the video content. For example, the first receiver station includes antenna 124a and STB 110a. The STB 110a includes one or more tuners, demodulators, decoders, and/or other signal processing subsystems configured to extract video data streams from the downlink signal 118 received at the antenna 124a. Additional aspects of the STB are described below in connection with FIG. 2.

The data streams distributed by the content distribution system 102 may be data indicative of video and/or audio content from one or more content providers (e.g., programming from various networks, real time video coverage of live events, and/or previously recorded video content, such as movies and the like). Thus, the video sources 114a, 114m may include television broadcast stations that are communicatively linked to the content distribution system 102 via wireless and/or wireline networks. In some examples, the video sources 114a, 114m may include previously recorded video data stored on data storage in communication with the content distribution system 102 and/or data storage included in the content distribution system 102.

The uplink controller 104 can process the incoming video data streams so as to encode the video data streams onto one or more transponder carriers of the satellite 108. In some examples, the uplink controller 104 may apply various error correction schemes to ensure data packets are accurately received. The uplink controller 104 may also apply various encryption schemes to ensure that broadcast signals are successfully received (e.g., decrypted) by subscribers to the service provider that operates the content distribution system 102. In some cases, information for decrypting and/or decoding the broadcast signals can be sent to subscribers STBs 110a, 110n via the network 112.

In addition to error correction and/or encryption, the content distribution system 102 may also include various subsystems 106 for performing additional functions related to distributing audio and/or video content for reception by subscribers. The subsystems 106 may include a guide management system that includes information indicative of content broadcast by the content distribution system 102. The guide management system may provide information that can be used by STBs 110a, 110n to render a guide to available content that users can navigate via a user interface of the STBs 110a, 110n and thereby select particular programming from amongst the available content. Once particular content is selected, the STBs 110a, 110n can then demodulate, decode, and/or decrypt signals corresponding to that content and provide the resulting video data for viewing and/or recording. In some examples, the subsystems 106 may also include a subscriber account subsystem which functions to manage accounts for individual subscribers. Among other aspects, the subscriber account subsystem may manage subscriber authentication (e.g., passwords), allow for subscribers to tender payments, manage subscription (e.g., channels subscribed to), manage viewing preferences, etc. The content distribution system 102 may alternatively be referred to as a head end of the system 100.

In some examples, content distribution system 102 may communicate data to STBs 110a, 110n via network 112. For example, in response to a request from a subscriber, content distribution system 102 may stream particular requested video content to that subscriber's STB via network 112 when that content is not currently being broadcast via uplink/downlink signals 116, 118. Network 112 may be representative of one or more types of networks, such as a wide area packet switched network (e.g., the Internet), public switched telephone network, a mobile telephone network, or another type of communication network.

In some examples, STBs 110a, 110n may be interconnected with one or more devices via a local network for an individual subscriber (not illustrated). The local network, which may be a wired network or wireless network, may be used to interconnect STBs within a household, multi-dwelling unit, or commercial building. The local network may also allow for multi-room viewing of content stored on a first STB (such as set-top box 110a) and communicated to a second STB through the local network. The stored content can comprise content the STB 110a receives via antenna 124a and records to local data storage within the STB 110a, such as a hard drive unit.

It should be understood that, although not illustrated, multiple satellites, head ends, servers, and other components might be included in the digital broadcast system 100. Moreover, while multiple components are illustrated separately, it should be understood that one or more of the components may be implemented as distributed components that are in communication with one another.

II. Example Receiver Station

Figure 2:
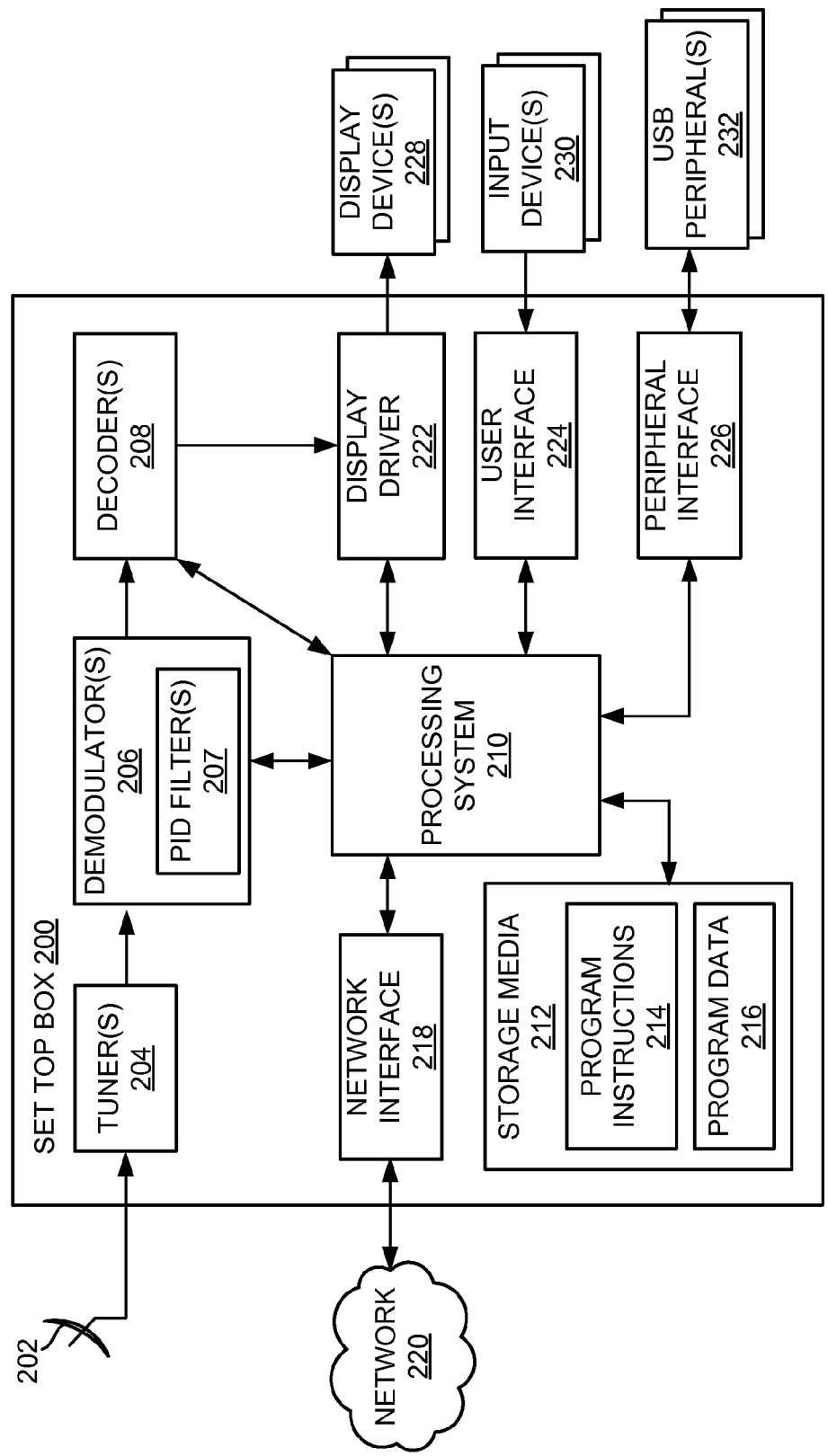
FIG. 2 is a functional block diagram of an example receiver system for a digital broadcast subscriber.

FIG. 2 is a functional block diagram of an example receiver system 200 for a digital broadcast subscriber. The receiver system 200 may be implemented as a computing device in a variety of forms, but is described herein as a set-top box (STB). For example, the receiver station 200 may comprise or be arranged as the STBs 110a, 110n of FIG. 1. The STB 200 may be a computing device used for operating television systems or other media display.

The STB 200 includes a tuner 204, a demodulator 206, a packet ID filter 207, a decoder 208, a processor 210, a memory 212, one or more storage devices 212, a user interface 224, a network interface 218, and a display driver 222. In some examples, the STB 200 may include multiple tuners, demodulators, and/or packet ID filters for receiving signals on multiple carriers in parallel. The components described in FIG. 2 may be communicatively linked by a system bus, network, or other connection mechanism. It is noted that the block diagram of FIG. 2 is not intended to illustrate each and every aspect of the STB 200, but instead illustrates certain components involved in receiving and processing video data streams. For instance, the STB 200 includes a power supply, although that is not specifically illustrated. Moreover, the connections shown in FIG. 2 illustrate the path of some data communicated between various components, and is not intended to provide an exhaustive diagram of all electrical and/or communication connections.

The STB 200 also includes a peripheral interface 226 for coupling to peripheral components 232. The peripheral interface 226 may include a universal serial bus (USB) terminal, or another terminal for communicating data signals. In some cases, the peripheral interface 226 may also be used to provide power supply to peripheral components 232.

The STB 200 includes inputs for receiving a signal from a satellite antenna 202 (e.g., a coaxial port). The antenna 202 may be one of a number of different types of antennas that may include one or more low noise blocks down converters (LNB) associated therewith. For instance, antenna 202 may be a single antenna for receiving signals from a satellite (such as the downlink signal 118 transmitted from satellite 108 of FIG. 1). In some cases, the antenna 202 may additionally or alternatively be used to receive signals broadcast from terrestrial sources. In another instance, antenna 202 may include multiple antennas for receiving signals from satellites in different orbital slots. In yet another instance, signals and other items described as being received by antenna 202 can be received by network interface 218 by way of a coaxial cable, antenna, or another component for communicating information over network 220. In that regard, one or more signals or items received at network interface 218 may be forwarded to tuner 204 (e.g., via a signal splitter).

The antenna signal received at tuner 204 may be a modulated signal that includes encoded data indicative of audio and/or video content on multiple carriers. The content of the signal may vary based on the type of signal. For example, the content may include television programming content (e.g., a television signal), program guide data or other types of data. The tuner 204 can be configured to filter the incoming signal to select a frequency range associated with a single carrier, and convert that frequency range to baseband. Tuner 204 communicates the resulting signal to demodulator 206.

Demodulator 206 receives the signal from the tuner 204 and demodulates the signal to generate a demodulated signal (e.g., a demodulated data stream). The demodulator 206 may include or be associated with various signal processing modules, such as the packet ID filter 207 and/or other modules. For instance, the demodulated data stream may be processed in accordance with an error correction algorithm. For a given carrier, the demodulated data stream generated by the demodulator 206 may include multiple video data streams multiplexed together. Data packets for each stream within such a multiplexed stream are identified by packet identifiers. The packet ID filter 207 is configured to filters the demodulated data stream for data packets that correspond to a desired data stream. The packet ID filter 207 may, for example, identify packets for a desired data stream based on the packet identifiers of those data packets, and then use the identified data packets to generate the desired data stream. The filtered, demodulated data stream may be provided to decoder 208, which may decode the demodulated signal to form a decoded signal or decoded data. The decoded signal may be sent to processor 210 and/or display driver 222. However, other examples are also possible in which data is extracted based on signals received at the antenna 202.

The processing system 210 may include any type of processor, such as a microprocessor, a microcontroller, a digital signal processor (DSP), multicore processor, etc. Processor 210 may be used to coordinate or control tuner 204, demodulator 206, packet ID filter 207, decoder 208, and any other components of computing device 200 that may or may not be illustrated in FIG. 2. In some implementations, processor 210 may include an internal memory controller (not illustrated). Yet other implementations may include a separate memory controller that can be used with processor 210.

Storage media 212 may include program logic 214 and program data 216. Program logic 214 may include programming instructions, such as computer executable or logic-implemented instructions. In some examples, the programming instructions may be provided or otherwise obtainable in a downloadable format, such as via network 220 (e.g., network 112 in FIG. 1). Program data 216 may include program information that can be directed to various data types. For instance, program data 216 and/or program instructions 214 may include one or more applications that, when executed by the processor 210, cause one or more processes to be carried out in accordance with algorithms indicated by the program instructions 214. Program data 216 may also include data (such as customer account information) that may be stored in STB 200. In some cases, the storage media 212 may also include a storage device such as a hard drive that can be used to store recorded content for subsequent playback in accordance with user inputs.

Generally, storage media 212 may include a non-transitory computer-readable medium, for example, such as computer-readable media that stores data for short periods of time like solid-state memory, flash drives, register memory, processor cache and Random Access Memory (RAM). The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium or a tangible storage device. In some cases a memory bus can be used for communicating between the processor 210 and storage media 212.

In some implementations, storage media 212 may be distributed between one or more locations and/or devices. For example, at least a portion of memory may reside within processor 210. In another example, all or part of memory may reside on a data storage device. Data storage devices included in the STB 200 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

STB 200 may also include a user interface 224 that is configured to allow a subscriber to interact with STB 200 via one or more input devices 230. In some examples, the input device 230 may include a remote control (or more simply, a remote), keyboard, a computer mouse, one or more push buttons, a touch screen, a smart phone, a tablet PC, a voice activated interface, or another system for receiving input. Moreover, in some cases, user input may be communicated via the network interface 218 and/or peripheral interface 226. Input device 230 may be used, for example, to select a channel, select information, change the volume, change the display appearance, or other functions using user interface 224. The process of making a selection with input device 230 may take a variety of forms and may involve an action taken by a user which is detected in some manner by the input device(s) 230, which then sends data indicative of the detected action to the STB 200.

The network interface 218 may take a variety of forms and function to allow the STB 200 to send and receive data via the network 220. For example, network interface 218 may be an Ethernet, MoCA, WiFi, WiMax, WiMax mobile, data over cable service interface specification (DOCSIS), wireless, cellular, or other types of interfaces. Moreover, network interface 218 may use a variety of protocols for communicating via the network 220. For instance, network interface 218 may communicate using Ethernet, a Transmission Control Protocol/Internet Protocol (TCP/IP), a hypertext transfer protocol (HTTP), or some other protocol.

STB 200 can also be coupled to a display 228. Display 228 may be a television, monitor, or other device configured to display images. The images may be video, graphics, text, or any variety of other visual representations rendered in accordance with content indicated by the STB 200. In some examples, the display 228 may include a pixelated display of elements which can be controlled to adjust their emissivity, transmissivity, and/or reflectivity so as to render images on the pixelated display. The display 228 may also include electronics for generating driving signals to operate the display elements based on received a video data streams. In some implementations, the display 228 may also include video processing modules for decompressing received compressed video data to decompressed video that can be used to drive the display elements (i.e., codecs), as well as applying various video effects, such as color and/or brightness corrections, compensation for mura, etc. Thus, in some examples, functionality of one or more aspects of video processing components shown in FIG. 2, such as the decoder 208 and/or display driver 222, may be performed in whole or in part by the display 228. In such examples, the data provided to the display 228 from the STB 200 may be a compressed video data stream generated by the tuner 204, demodulator 206, and PID filter 207. In some examples, the display 228 may include an audio output, such as a loudspeaker, to generate sound waves from media signals received by display 228.

Furthermore, in some cases the STB 200 may be configured to use the network interface 218 to send a video data stream to the display 228. For instance, the STB 200 may output a compressed video data stream through the network interface 218. The video data stream can then be conveyed to the display device 228 via a local area network, such as a television or another client compliant with the RVU protocol (e.g., a device configured to receive a video data stream from a STB via a local network connection, and then render the received video data stream on an integrated display). In some cases, the network interface 218 may include a multimedia over coaxial cable interface (e.g., an interface compliant with the Multimedia over Coaxial Alliance (MoCA) protocols) for communicating data streams via a coaxial cable connection. Thus, the display device 228 may include a network interface for receiving a compressed video data stream, and various video processing electronics (e.g., codecs, modules for providing compensation and/or corrections, etc.) that use the network-delivered video data stream to generate driving signals for an array of display elements based on the received video data stream.

The STB 200 includes a display driver 222 for communicating with the display 228. In some examples, display driver 222 may work in conjunction with a graphics processing unit (not illustrated), which can be configured to communicate with display device 228. Display driver 222 may communicate with display device 228 by a high-definition multiple interface (HDMI) cable, a coaxial cable, some other wired communication link, or via a wireless connection. In some examples, computing device 200 may communicate directly or indirectly with one or more additional devices, either via network 220, peripheral interface 226, or through additional interfaces. Communication may be embodied by computer-readable instructions, data structures, program modules, or other data in a modulated data signal, such as a carrier wave or other transport mechanism. By way of example, and not limitation, communication media can include wired media such as a wired network or direct-wired connection, and wireless media such as acoustic, radio frequency (RF), infrared (IR) or other wireless media.

In an example operation, a user uses the input device 230 to provide an indication of a particular video data stream to extract from an incoming satellite signal (e.g., by selecting a channel via a content guide interface rendered on the display device 228). Based on the received user input, the processing system 210 operates the tuner 204, demodulator 206, and packet ID filter 207 to tune to a carrier associated with the particular video data stream, demodulate that signal, and filter the data in the demodulated signal. The processing system 210 can then operate the display driver 222 and/or storage media 212 to communicate with the display device 228 so as to render the video data stream and/or record the video data stream to a data storage device. As such, the STB 200 can be used by a subscriber to a digital broadcast system to receive, process, and make use of digital video data broadcast by a service provider over a satellite communication network (e.g., the digital broadcast system 100 of FIG. 1).

III. Example Digital Broadcast Schemes

As noted above, a digital broadcast system can be used to distribute video data streams to subscribers using signals broadcast through a satellite communication network. However, digital video data is compressed prior to transmission in order to conserve bandwidth resources (e.g., in accordance with various compression standards such as MPEG, MPEG-4, H.264, HEVC, among other possibilities). Because video compression algorithms result in different bit rates depending on the spatial frequency (e.g., texture) of video content and also depending on the temporal frequency (e.g., motion) of the video content. As such, the compressed data streams are variable bit-rate data streams characterized by a peak bit rate and an average bit rate. Due to hardware and/or regulatory limitations, uplink and downlink transmission to and from a satellite communication network use a set of fixed bit-rate carriers.

A. Low Bandwidth Video Data

To efficiently use the available spectral resources, satellite broadcast service providers therefore use a statistical multiplexer (STATMUX) that combines together data packets of compressed video data streams into a single data stream which has a peak bandwidth within the capacity of an individual carrier. Because the peak data rates of the different video data streams do not align in time, the combined data stream has a lower peak bandwidth than the sum of the peak bandwidths of the constituent data streams, which may improve spectral efficiency. At the service provider head end, the carrier-specific combined data stream can then be encoded, error corrected, encrypted, and modulated onto the particular carrier, which is transmitted via an uplink transmission. The satellite is equipped with multiple transponders each configured to receive a particular modulated carrier and transmit a corresponding downlink signal. The downlink signal from the satellite therefore includes modulated data at each of the carriers of the satellite transponders. At a receiver station (e.g., STB), one or more of the carriers can be tuned and demodulated and/or decrypted to recover the combined data stream. Data packets for a desired video data stream can then be identified from the combined stream to extract the desired video within the STB. This process is shown in connection with FIGS. 3A and 3B.

Figure 3A:
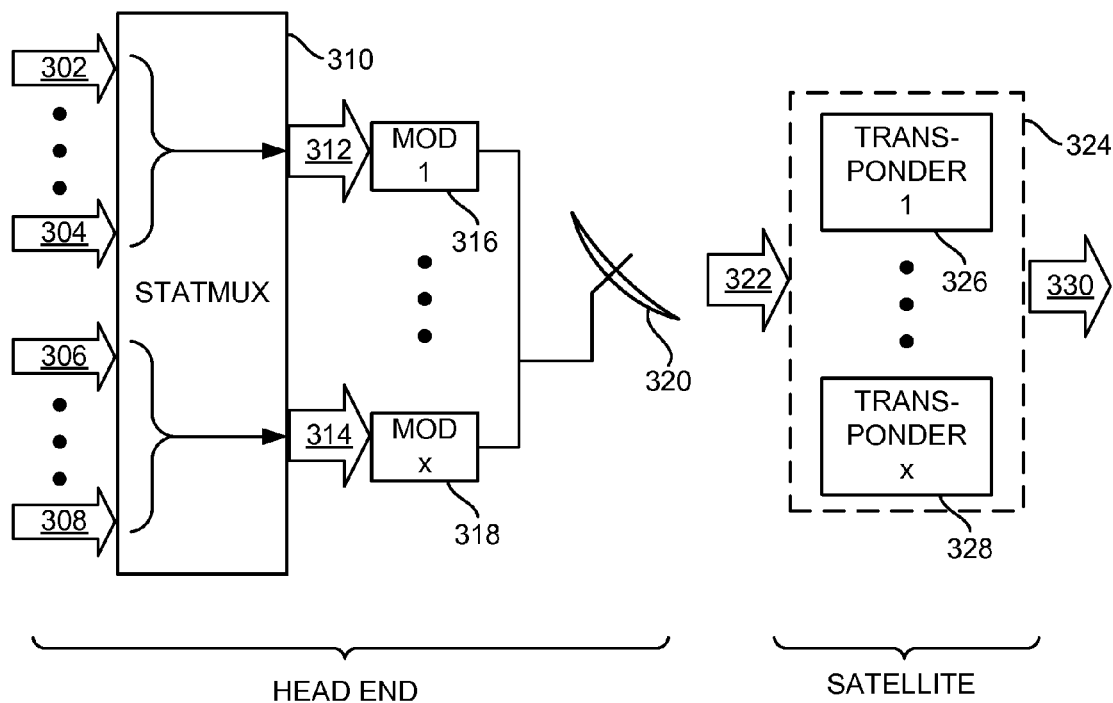
FIG. 3A is a diagram that shows distribution of low bandwidth video data streams amongst individual transponder carriers.
Figure 3B:
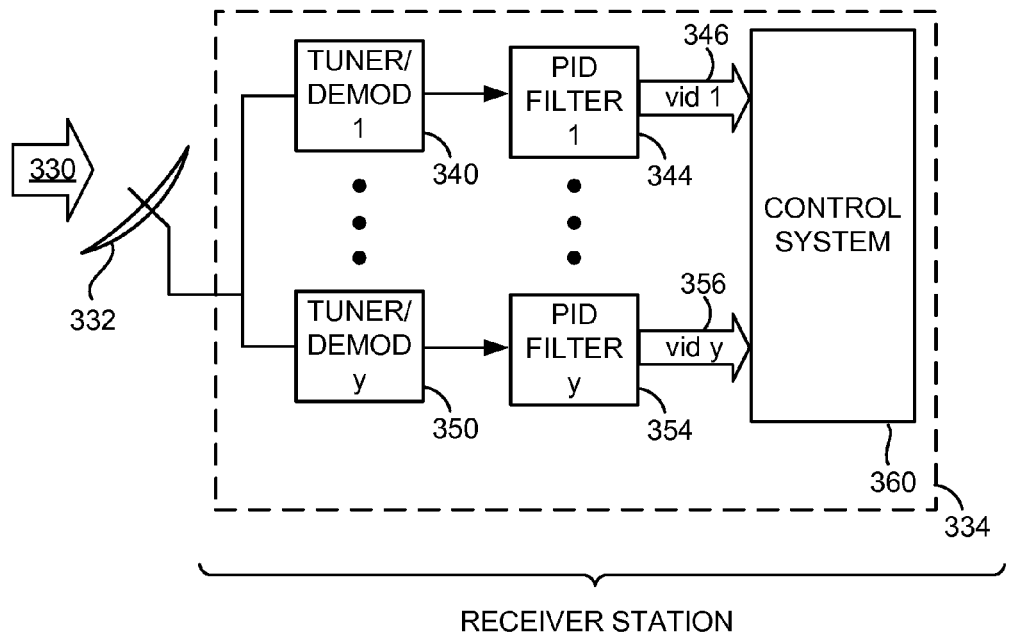
FIG. 3B is a diagram that shows a receiver system processing low bandwidth video data streams from a satellite signal.

FIG. 3A is a diagram that shows distribution of low bandwidth video data streams amongst individual transponder carriers. FIG. 3B is a diagram that shows a receiver system 334 processing low bandwidth video data streams from a satellite downlink signal 330.

For instance, multiple variable bit rate compressed video data streams 302-308 can be provided to a head end of a content distribution system (e.g., the digital broadcast system 100 of FIG. 1). A statistical multiplexer 310 combines groups of the low bandwidth data streams into combined data streams for transmission over individual transponder carriers. For example, STATMUX 310 may combine data streams 302-304 to generate data stream 312 and data streams 306-308 to generate data stream 314. The combined data streams 312, 314 can then be processed to apply error correction and/or encryption and then the processed data can be modulated onto respective carriers using modulators 316, 318. A separate modulator may be provided for each carrier of the transmission system. Thus, the combined data stream 312 can be processed/modulated via modulator 316 and the combined data stream 314 can be processed/modulated via modulator 318. The modulated signals can then be provided to uplink antenna 320, which transmits the uplink signal 322 to satellite 324. At the satellite 324, each transponder carrier within the uplink signal 322 can be processed by a respective transponder 326, 328, which generates a corresponding downlink signal. The resulting downlink signal 330 thus corresponds to the uplink signal 322 and includes information indicative of the original video data streams 302-308.

At the receiver station, shown in FIG. 3B, the downlink signal 330 is received by an antenna 332, which is coupled to a STB 334. The incoming antenna signal is then processed by a set of tuner/demodulators and packet ID filters to extract desired video data streams that are processed by a control system 360. The STB 334 can function similarly to the STB 200 described above in connection with FIG. 2 to extract particular video data streams in accordance with user input and display that content on one or more displays or record that content for later viewing. The STB 334 can include multiple sets of tuner/demodulators and packet ID filters so as to extract multiple low bandwidth video data streams in parallel, such as when one incoming video program is being viewed and one or more additional programs are being recorded for later viewing or displayed on another display device.

Thus, as shown in FIG. 3B, a first video data stream 346 can be extracted using a first tuner/demodulator 340, which tunes to a carrier associated with video data stream 346 and provides a demodulated signal for that carrier to a first packet identifier filter 344, which identifies particular data packets within the combined data stream with packet identifiers that correspond to the desired video data stream 346. The packet ID filter 344 then filters the combined data stream to extract only the packets for the desired video data stream 346, which is then provided to the control system. Similarly, another tuner/demodulator 350 and packet ID filter 354 can be used to extract another video data stream 356 on another carrier and with another set of packet identifiers.

The carriers and packet identifiers for particular video data streams for particular video data streams can be identified by the control system 360 based on overhead messaging provided to the control system 360 via another channel of the incoming antenna signal 330 (or perhaps via a network connection) and which indicates carriers, packet identifiers, decryption algorithms, etc., for a given video data stream that may be selected for viewing/recording by a subscriber.

B. High Bandwidth Video Data—Transponder Bonding

However, when the bandwidth required by individual video data streams is comparable to the capacity of the individual transponder carriers, the spectral efficiency gains from using the STATMUX are largely negated as there is not enough bandwidth to efficiently mix together different data variable bit-rate streams. Therefore, for high bandwidth video data streams, such as 4 KTV, 3 DTV, and other high bandwidth content, satellite broadcast service providers combine such high bandwidth video data streams into a single combined data stream that can be broadcast over a group of multiple transponder carriers in parallel. This process is shown in connection with FIGS. 4A and 4B.

Figure 4A:
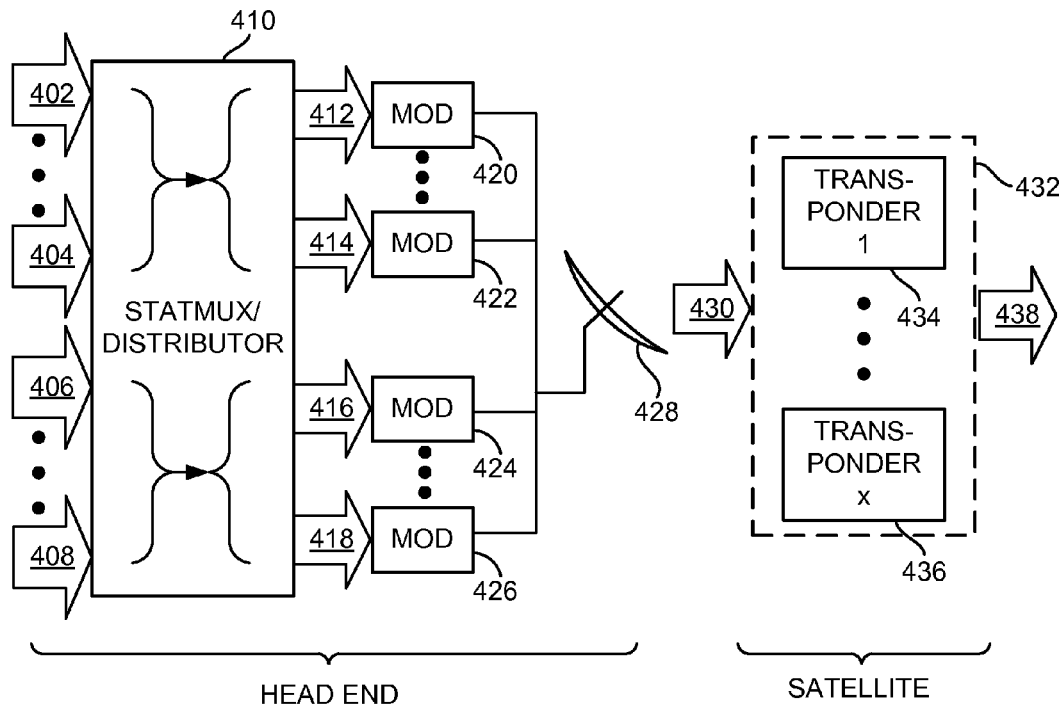
FIG. 4A is a diagram that shows distribution of high bandwidth video data streams amongst multiple transponder carriers.
Figure 4B:
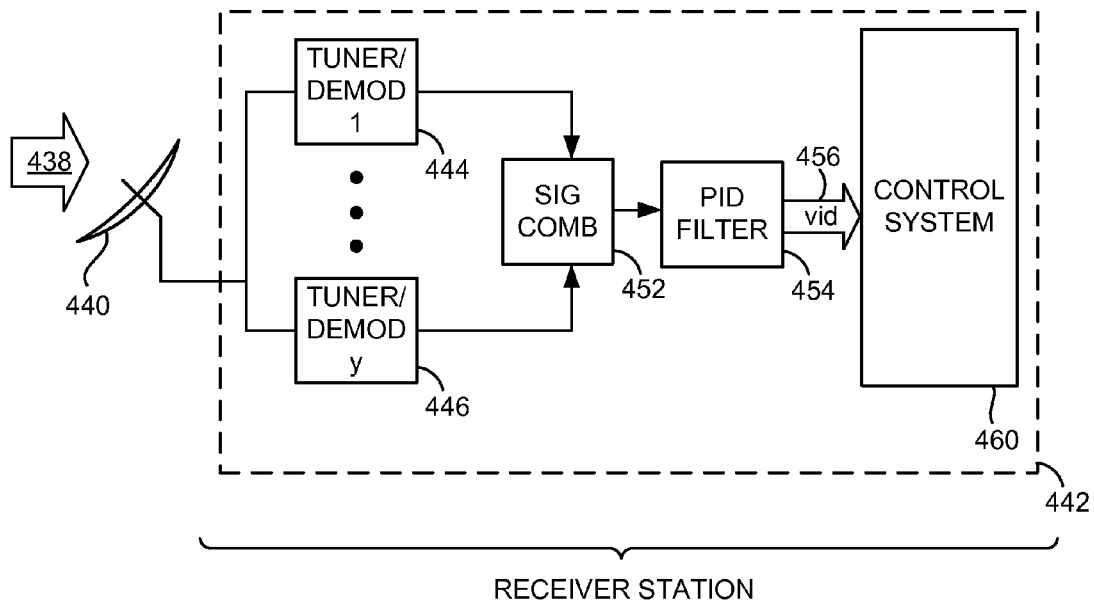
FIG. 4B is a diagram that shows a receiver system processing a high bandwidth video data stream from a satellite signal.

FIG. 4A is a diagram that shows distribution of high bandwidth video data streams amongst multiple transponder carriers. FIG. 4B is a diagram that shows a receiver system processing a high bandwidth video data stream from a satellite signal. For instance, multiple variable bit rate compressed video data streams 402-408 can be provided to a head end of a content distribution system (e.g., the digital broadcast system 100 of FIG. 1). A statistical multiplexer 410 combines groups of the high bandwidth data streams into combined data streams for transmission over multiple transponder carriers. For example, STATMUX 410 may combine high bandwidth video data streams 402-404 to generate a first combine data stream (i.e., a very high bandwidth data stream), and then the first combined data stream can be distributed amongst multiple transponder carriers to generate a set of data streams 412-414. Similarly, high bandwidth video data streams 406-408 may be combined to generate another combined data stream (i.e., a very high bandwidth data stream), and then the combined data stream can be distributed amongst multiple transponder carriers to generate another set of data streams 416-418. Prior to distributing the combined very high bandwidth data stream, the multiplexer/distributor 410 (or another subsystem) may apply various processes, such as error correction encoding, encrypting, etc. The combined very high bandwidth data stream is then divided into portions that are assigned to each transponder carrier, and each portion is marked to allow the very high bandwidth combined data stream to be reassembled upon receipt (e.g., with header data that indicates the relationship of each portion with respect to others).

The statistical multiplexer 410 of FIG. 4A is therefore a combined multiplexer and distributor, because it first combines high bandwidth variable bit-rate video data streams into a single combined data stream and then distributes the combined data stream across fixed bit-rate transponder carriers. It is noted that some examples of head ends may include separate modules that perform the statistical multiplexing and distributing functions, respectively. In some cases, the statistical multiplexer/distributor 410 may function such that data for one or more high bandwidth video data streams are distributed amongst three transponder carriers. Once generated, the data streams for each transponder carrier can be modulated using modulators 420-426. A separate modulator may be provided for each carrier of the transmission system. Thus, the combined data stream for high bandwidth video data streams 402-404 can be distributed amongst data streams 412, 414, and those data streams 412, 414 can be modulated via modulators 420, 422. Similarly, the combined data stream for high bandwidth video data streams 406-408 can be distributed amongst data streams 416, 418, and those data streams 416, 418 can be modulated via modulators 424, 426. The modulated signals can then be provided to uplink antenna 428, which transmits the uplink signal 430 to satellite 432. At the satellite 432, each transponder carrier within the uplink signal 430 can be processed by a respective transponder 434, 436, which generates a corresponding downlink signal 438. The resulting downlink signal 438 thus corresponds to the uplink signal 430 and includes information indicative of the original high bandwidth video data streams 402-408.

At the receiver station, shown in FIG. 4B, the downlink signal 438 is received by an antenna 440, which is coupled to a STB 442. The incoming antenna signal is processed by a set of tuner/demodulators 444, 446, a signal combiner 442, and a packet ID filter 454 to extract a desired video data stream 456 that is processed by a control system 460. In some respects, the STB 442 can function similarly to the STB 200 described above in connection with FIG. 2 to extract particular video data streams in accordance with user input and display that content on one or more displays or record that content for later viewing.

Thus, as shown in FIG. 4B, a first high bandwidth video data stream 454 can be extracted using a group of tuner/demodulators 444, 446, which tune to respective carriers associated with video data stream 456 and provide demodulated signals for those carriers. The tuner/demodulators 444, 446 may be tuned to demodulate signals used to carry a data stream distributed across multiple carriers (i.e., the set of carriers used to carry the data stream including the high bandwidth video data stream 456). The resulting data stream is provided to the signal combiner 452. The signal combiner 452 may be configured to assemble the demodulated signals using markers that indicate the relative relationship amongst portions of the very high bandwidth data stream from each transponder carrier. The signal combiner 452 provides the combined, very high bandwidth data to the packet ID filter 454, which identifies particular data packets within the combined data stream with packet identifiers that correspond to the desired video data stream 456. The packet ID filter 454 then filters the combined data stream to extract only the packets for the desired video data stream 456, which is then provided to the control system 460.

The carriers and packet identifiers for particular video data streams for particular video data streams can be identified by the control system 460 based on overhead messaging provided to the control system 460 via another channel of the incoming antenna signal 438 (or perhaps via a network connection) and which indicates carriers, packet identifiers, decryption algorithms, etc., for a given video data stream that may be selected for viewing/recording by a subscriber.

FIG. 4B shows components used to extract a single high bandwidth video data stream 456 from a group of transponder carriers, although some examples may include additional tuner/demodulators, signal combiners, and packet ID filters to allow for simultaneously extracting multiple high bandwidth video data streams. Thus, some examples may allow for operations when one incoming high bandwidth video program is being viewing and one or more additional high bandwidth video programs are being recorded for later viewing or displayed on another display device.

IV. Peripheral Transponder Bonding Module

FIG. 5 is a functional block diagram of an example peripheral transponder bonding module 500. The peripheral transponder bonding module 500 is a device with tuners, demodulators, and other electronics for extracting high bandwidth video data streams by combining signals on multiple transponder carriers. The peripheral transponder bonding module 500 can be coupled to a STB, such as the STB 200 described in connection with FIG. 2, via a data port such as a universal serial bus (USB), and thereby allow the STB to receive and process high bandwidth video data streams even when the STB does not include hardware components for combining signals on multiple carriers to extract a high bandwidth video data stream. The peripheral transponder bonding module 500 includes a housing 502, a USB interface 528, and one or more ports for receiving antenna signals. Within the housing 502, the peripheral transponder bonding module 500 can include a splitter 508 for dividing the received antenna signal 504. The splitter 508 can be coupled to a set of tuner/demodulators 510 that can be used to tune to respective transponder carriers and demodulate the data on those carriers. The tuner/demodulators 510 can be coupled to a signal combiner 520, and a packet ID filter 524 that can be used to extract a high bandwidth video data stream from a combined data stream distributed amongst multiple transponder carriers. A control system 526 can communicate with the components of the peripheral transponder bonding module 500 and coordinate the operations of the various components to provide desired functionality. In some examples, the control system 526 may include a processor executing program instructions stored on a memory.

The tuner/demodulators 512, 514, 516 can include multiple tuners each associated with a respective demodulator. Each of the tuner/demodulators 512, 514, 516 can operate in accordance with instructions from the control system 526 to tune to particular transponder carriers, and demodulate data on those carriers. For instance, the control system 526 may instruct two or more of the tuner/demodulators 512, 514, 516 to tune to carriers on which a combined data stream for high bandwidth video content is distributed. The resulting data from each of the tuner/demodulators 512, 514, 516 can then be provided to the signal combiner 520, which can assemble the very high bandwidth data stream that was distributed amongst the transponder carriers. The signal combiner 520 may operate in accordance with instructions from the control system 526 and may also use markers or other data included in the data to assemble portions of the very high bandwidth data stream with respect to one another so as to generate the combined data stream. The combined very high bandwidth data stream may include data from multiple high bandwidth video data streams, and so the packet ID filter 524 can be used to identify and filter out a desired one of the video data streams. In some examples, the control system 526 may instruct the packet ID filter 524 to identify data packets having packet identifiers associated with the desired high bandwidth video data stream and use those packet identifiers to generate the desired high bandwidth video data stream.

The peripheral transponder bonding module 500 may also include one or more additional signal combiner(s) coupled to multiple of the tuner/demodulators 510 for extracting multiple high bandwidth video data streams in parallel. For instance, the tuner/demodulators 510 may include eight sets of tuners and demodulators and each set can be used to output data for a respective transponder carrier. The control system 526 can be used to determine which one(s) of the carriers to tune to and demodulate, and thus which sets of data to provide to signal combiner(s). In some cases, an additional signal combiner may be coupled to another of the set of the tuner/demodulators 510 that does not overlap with the tuner/demodulators coupled to the signal combiner 520. The additional signal combiner can be used to generate a combined very high bandwidth data stream that can be filtered to extract another high bandwidth video data stream in parallel with the signal combiner 520 and packet ID filter 524. Other examples are also possible in which even more components are included to provide even more functionality.

Once a desired high bandwidth video data stream is generated, the control system 526 may use the USB interface 528 to communicate the high bandwidth video data stream via signals 530. In some examples, inputs indicating a particular high bandwidth video data stream to extract may be input to the peripheral transponder bonding module 500 via the USB interface 528. The USB interface 528 can also be used to receive information indicative of available content, user inputs, subscriber information, authentication information, decryption information, and any other information useful in providing the functionality described herein. Thus, a device coupled to the peripheral transponder bonding module 500 can receive a desired high bandwidth video data stream.

In addition, the module 500 may include an output port for providing a copy 506 of the received antenna signal 504 output from the splitter 508. For example, the copy 506 may be output for use by additional components. In some cases, a STB may be coupled to receive the output copy 506 and also be coupled to the USB interface 528.

In an example operation, such a STB may receive a user input indicating a particular high bandwidth video data stream to extract for viewing and/or recording, and the STB can provide an indication of that high bandwidth video data stream along with any other information useful for extraction to the module 500 via the USB interface 528. The STB may use the copy 506 of the antenna signal 504 to extract program guide information and/or overhead messaging indicative of transponder carriers and/or packet identifiers associated with particular content. The STB can then receive inputs from a user, which may be based in part on an interaction with the program guide, and provide information 530 based on those inputs to the module 500 via the UBB interface 528. In response, the control system 526 can operate the tuner/demodulators 510, signal combiner 520, and packet ID filter 524 to extract the requested high bandwidth video data stream and output that video data stream using the USB interface 528.

The peripheral transponder module 500 can be communicatively coupled to a STB, such as the STB 200 described in connection with FIG. 2, to extract transponder bonded high bandwidth video data streams. The peripheral transponder module 500 can therefore be used to allow a legacy STB to receive high bandwidth video data streams even when that STB is not equipped with hardware components for combining signals on multiple transponder carriers.

Moreover, it is noted that that the USB interface 528 may be replaced with another data interface for communicating data via various terminals in accordance with various protocols. The USB interface and/or USB terminal are provided by way of example of one type of data connection between computing devices that can be used in some embodiments, but is in no way a limitation of the present disclosure as other data terminals and data interfaces may be used.

FIGS. 6A and 6B are aspect views of an example USB transponder bonding module 600. The transponder bonding module 600 includes a housing 602 with a first end 604 and a second end 606. The first end 604 includes a USB terminal 610, and the second end 604 includes a pair of coaxial terminals 612, 614. The USB terminal 610 may be configured for being coupled to another computing device as a peripheral device, such as a STB. The coaxial terminal 612 may be an input terminal for receiving an antenna signal and the coaxial terminal 614 may be an output terminal for providing a copy of the received antenna signal to another component (e.g., a STB). As shown in FIGS. 6A and 6B, the USB terminal 610 and the coaxial terminals 612, 614 may be mounted so as to be situated along the exterior of the housing 602.

V. Example Operations

Figure 7:
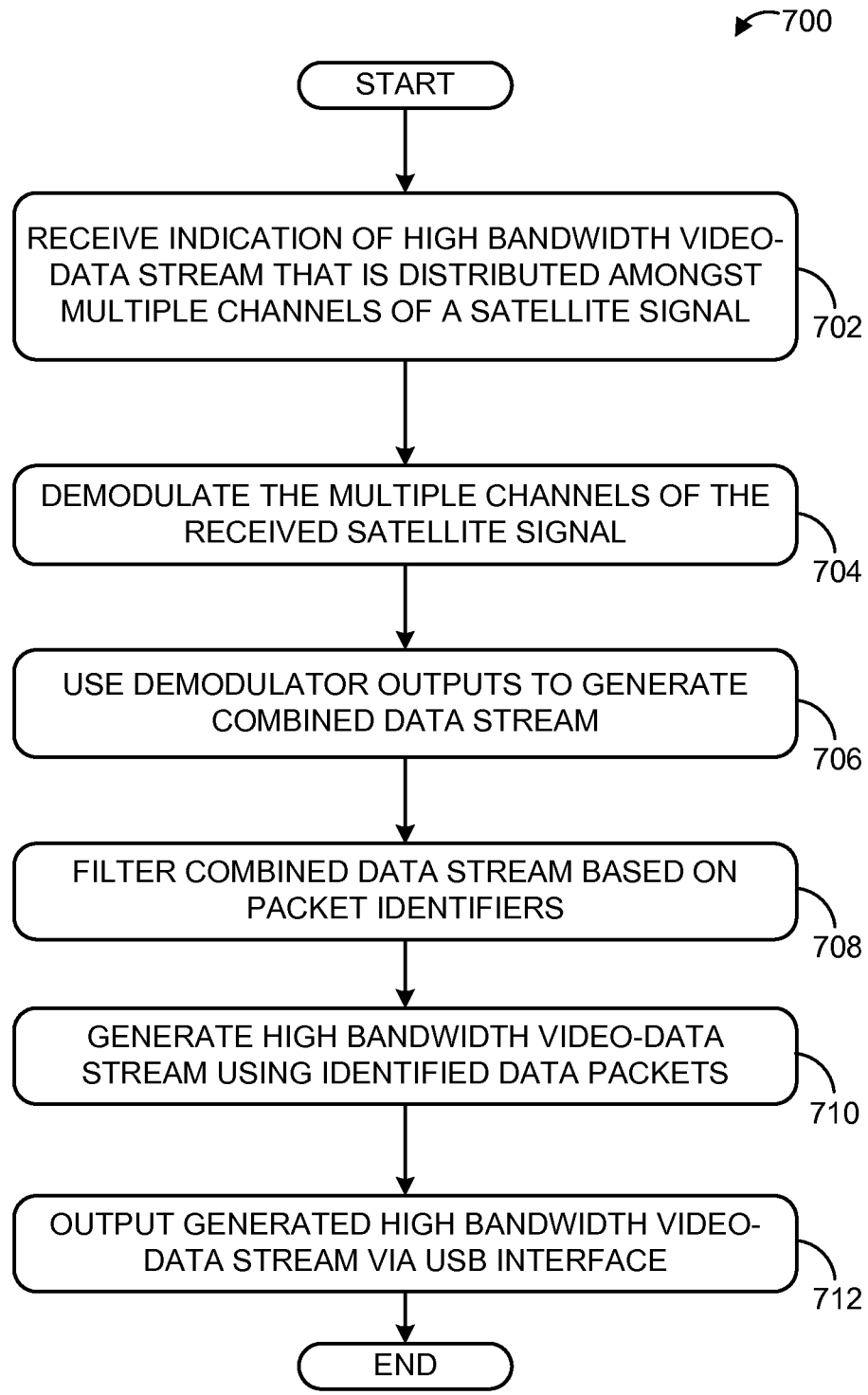
FIG. 7 is a flowchart of an example process that can be performed by a peripheral transponder bonding module.

FIG. 7 is a flowchart of an example process 700 that can be performed by a peripheral transponder bonding module. The process may be performed using the peripheral transponder bonding modules 500, 600 described in connection with FIGS. 5 and 6A-6B, and may be performed by a device or components of one or more devices.

At block 702, an indication may be received of a particular high bandwidth video-data stream that is distributed amongst multiple channels of a satellite signal. For example, the received indication may indicate a high bandwidth video-data stream that is encoded on a combined data stream that is combined amongst multiple satellite transponder carriers. For a peripheral transponder bonding module, the received indication may be received via a USB interface, for example.

At block 704, the multiple channels of the received satellite signal can be demodulated. For example, a peripheral transponder bonding module can include multiple tuner/demodulators and two or more of those can be used to tune to respective transponder carriers and demodulate data on those carriers. Because the desired high bandwidth video-data stream is distributed amongst the channels (e.g., transponder carriers), the output of each demodulator may be based on at least a portion of the desired high bandwidth video-data stream.

At block 706, the demodulator outputs can be used to generate a combined data stream. The combined data stream may be assembled using a signal combiner that uses markers, tags, header information or the like to assemble portions of data distributed amongst the different channels of the satellite signal so as to reconstitute a very high bandwidth data signal.

At block 708, the combined data stream can be filtered based on packet identifiers. For example, the combined data stream may include a series of data packets, and each data packet may have an associated identifier. Because the combined data stream may include data for multiple variable bit-rate compressed video-data streams, the data packets in the combined stream may not all correspond to the desired video-data stream. The packet identifiers can be used to identify the data packets of interest (and ignore the data packets for undesired content). For instance, data packets for the desired video-data stream can be identified based on one or more packet identifiers associated with the desired high bandwidth video-data stream.

At block 710, the high bandwidth video-data stream can be identified using the identified data packets described in block 708. Then, at block 712, the generated high bandwidth video-data stream can be output via the USB interface. For example, referring to FIG. 5, a desired high bandwidth video-data stream may be output to a STB via the USB interface 528.

Figure 8:
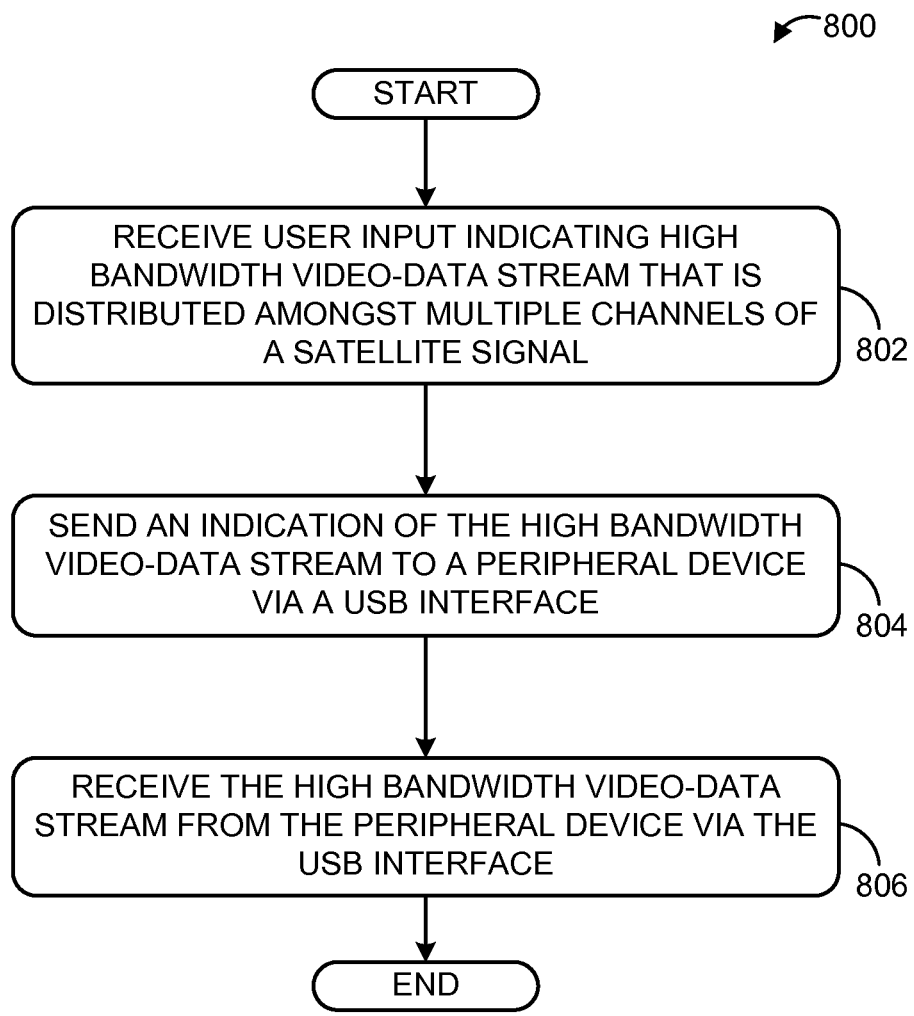
FIG. 8 is a flowchart of an example process that can be performed by an example receiving system.

FIG. 8 is a flowchart of an example process 800 that can be performed by an example receiving system. For purposes of illustration, the process 800 in FIG. 8 is described as being implemented by a computing device (such as set-top box 200 in FIG. 2), however, other examples are also possible. The computing device may be configured to receive one or more media signals. The media signals may include video, audio, or television signals. For example, the media signals may comprise information including a sequence of television signals. The computing device may demodulate the information to obtain the sequence of television signals. Though described as a sequence of television signals, it should be understood that any number of television signals may be received, such as a single television signal or a plurality of television signals.

At block 802, a user input can be received that indicates a particular high bandwidth video-data stream that is distributed amongst multiple channels of a satellite signal. For example, the STB 200 of FIG. 2 may receive an input via user interface 224 that indicates a particular high bandwidth video-data stream to be viewed and/or recorded.

At block 804, an indication of the particular high bandwidth video-data stream can be provided to a peripheral device via a USB interface. For example, the STB 200 may output an indication of the high bandwidth video-data stream indicated by user input at block 802 to a peripheral device via peripheral interface 226. The peripheral interface 226 may be coupled to a peripheral transponder bonding module, such as the module 500 of FIG. 5. As such, providing the indication of the particular high bandwidth video-data stream can cause the peripheral device to extract the indicated high bandwidth video-data stream from a satellite signal.

At block 806, the high bandwidth video-data stream can be received from the peripheral device via the USB interface. For example, the peripheral device may demodulate two or more channels of a satellite signal, use a signal combiner to generate a combined data stream from the demodulated signals, and then filter the combined data stream to extract the desired high bandwidth video-data stream and output that high bandwidth video-data stream via the USB interface to the STB.

Moreover, while the STB uses a peripheral device to receive a high bandwidth video-data stream in accordance with the process 800 of FIG. 8, the STB may simultaneously use tuners/demodulators within the STB to extract one or more video-data streams from the satellite signal. For example, the STB may receive an output signal from the peripheral device that copies the satellite signal to the STB to allow the STB to extract low bandwidth video-data streams in parallel with the peripheral device extracting high bandwidth video-data streams.

VI. Conclusion

While the processes described herein illustrate a number of blocks that are in a sequential order, these blocks may also be performed in parallel or in a different order than those described herein. Also, the various blocks may be combined into fewer blocks, or divided into additional blocks. In addition, it should be understood that the flowcharts show functionality and operation of possible implementations of the present embodiments, though other implementations are also possible. Moreover, each block in the flowcharts may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An apparatus comprising:
    a housing;
    an input interface that is configured to receive a satellite signal;
    a plurality of demodulators;
    a signal combiner; and
    a control system operable to:
        (i) receive, via a universal serial bus (USB) interface, an indication of a particular high bandwidth video-data stream that is distributed amongst two or more channels of the satellite signal;
        (ii) cause two or more of the demodulators to demodulate the two or more channels, such that an output from each of the two or more demodulators is based on at least a portion of the particular high bandwidth video-data stream;
        (iii) operate the signal combiner to generate a combined data stream based on demodulated outputs from the two or more demodulators;
        (iv) apply a packet ID filter to identify data packets in the combined data stream having one or more packet identifiers associated with the particular high bandwidth video data stream, and to filter the combined data stream to extract the identified data packets;
        (v) generate the high bandwidth video data stream using the identified data packets; and
        (vi) output the generated high bandwidth video data stream via the USB interface.

2. The apparatus of claim 1, further comprising:
    a signal splitter mounted within the housing, wherein the signal splitter is coupled to the input interface and configured to generate first and second split signals that are each based on the satellite signal, wherein the signal splitter is coupled to the plurality of demodulators so as to provide the first split signal to the plurality of demodulators; and
    an output interface coupled to the signal splitter so as to receive the second split signal from the signal splitter.

3. The apparatus of claim 2, wherein the output interface and the input interface are both coaxial terminals situated adjacent one another along the exterior of the housing.

4. The apparatus of claim 1, wherein the USB interface comprises a USB terminal mounted along an exterior of the housing.

5. The apparatus of claim 1, wherein the processing system is further configured to determine the two or more channels of the satellite signal on which the particular high bandwidth video-data stream is distributed.

6. The apparatus of claim 1, wherein the processing system is further configured to, while outputting the generated particular high bandwidth video-data stream:
    (vii) receive, via the USB interface, an indication of a second particular high bandwidth video-data stream distributed amongst a second group of two or more channels of the satellite signal;
    (viii) cause a second set of two or more of the demodulators to demodulate the second group of two or more channels, such that an output from each of the second set of two or more demodulators is based on at least a portion of the second particular high bandwidth video-data stream;
    (ix) operate the signal combiner to generate another combined data stream based on demodulated outputs from the second set of two or more demodulators;
    (x) identify a second set of data packets in the combined data stream having one or more packet identifiers associated with the second particular high bandwidth video-data stream;
    (xi) generate the second high bandwidth video-data stream using the identified second set of data packets; and
    (xii) output the generated second high bandwidth video-data stream via the USB interface.

7. The apparatus of claim 1, wherein the multiple demodulators comprise eight demodulators.

8. The apparatus of claim 1, wherein the channels of the received satellite antenna signal each correspond to a respective satellite transponder.

9. The apparatus of claim 1, wherein the control system comprises a packet identifier filter configured to identify the data packets in the combined data stream.

10. A method for extracting a high bandwidth video-data stream by a control system comprising:
receiving, via an input interface, a satellite signal;
receiving, via a universal serial bus (USB) interface, an indication of a particular high bandwidth video-data stream distributed amongst two or more channels of the satellite signal;
demodulating the two or more channels via two or more of a plurality of demodulators, such that an output from each of the two or more demodulators is based on at least a portion of the particular high bandwidth video-data stream;
generating a combined data stream based on demodulated outputs from the two or more demodulators;
applying a packet ID filter to identify data packets in the combined data stream having one or more packet identifiers associated with the particular high bandwidth video-data stream and to filter the combined data stream to extract the identified data packets;
generating the high bandwidth video-data stream using the identified data packets; and
outputting the generated high bandwidth video-data stream via the USB interface.

11. The method of claim 10, further comprising:
splitting the received satellite signal via a signal splitter so as to generate first and second split signals that are each based on the received satellite signal, wherein the signal splitter is coupled to the plurality of demodulators so as to provide the first split signal to the plurality of demodulators; and
providing the second split signal to an output interface, wherein the output interface is coupled so as to receive the second split signal from the signal splitter.

12. The method of claim 10, further comprising determining the two or more channels of the received satellite signal on which the particular high bandwidth video-data stream is distributed.

13. The method of claim 10, further comprising, while outputting the generated high bandwidth video-data stream:
receiving, via the USB interface, an indication of a second particular high bandwidth video-data stream distributed amongst a second group of two or more channels of the satellite signal;
demodulating the second group of two or more channels via a second set of two or more of the plurality of demodulators, such that an output from each of the second set of two or more demodulators is based on at least a portion of the second particular high bandwidth video-data stream;
generating a second combined data stream based on demodulated outputs from the second set of two or more demodulators;
identifying data packets in the second combined data stream having one or more packet identifiers associated with the second particular high bandwidth video-data stream;
generating the second high bandwidth video-data stream using the identified data packets; and
outputting the generated second high bandwidth video-data stream via the USB interface.

14. The method of claim 10, wherein the plurality of demodulators comprise eight demodulators.

15. The method of claim 10, wherein the channels of the received satellite signal each correspond to a respective satellite transponder.

16. The method of claim 10, further comprising determining the one or more packet identifiers associated with the particular high bandwidth video-data stream.

17. A method comprising:
receiving, via a user interface, an input indicative of a particular high bandwidth video-data stream that is distributed amongst two or more channels of a satellite signal;
sending, via a universal serial bus (USB) interface, an indication of the particular high bandwidth video-data stream to a peripheral device coupled to receive the satellite signal, wherein a control system in the peripheral device is configured to: (i) use two or more of a plurality of demodulators to demodulate the two or more channels of the satellite signal on which the particular high bandwidth video-data stream is distributed; (ii) generate a combined data stream based on outputs of the two or more demodulators; (iii) apply a packet ID filter to identify data packets in the combined data stream having one or more packet identifiers associated with the particular high bandwidth video-data stream and to filter the combined data stream to extract the identified data packets; (iv) generate the particular high bandwidth video data stream using the identified data packets; and (v) output the generated particular high bandwidth video data stream via the USB interface; and
receiving the particular high bandwidth video-data stream via the USB interface.

18. The method of claim 17, further comprising:
generating video driving signals based on the received high bandwidth video-data stream.

19. The method of claim 17, further comprising:
receiving, via the user interface, an input indicative of a particular low bandwidth video-data stream;
receiving a satellite signal;
demodulating a channel of the satellite signal associated with the particular low bandwidth video-data stream to generate a demodulated data stream;
identifying data packets in the demodulated data stream having one or more packet identifiers associated with the particular low bandwidth video-data stream; and
generating the low bandwidth video-data stream using the identified data packets.

20. The method of claim 19, wherein generating the low bandwidth video-data stream and receiving the high bandwidth video-data stream via the USB interface are performed in parallel.

* * * * *